Patented Sept. 25, 1923.

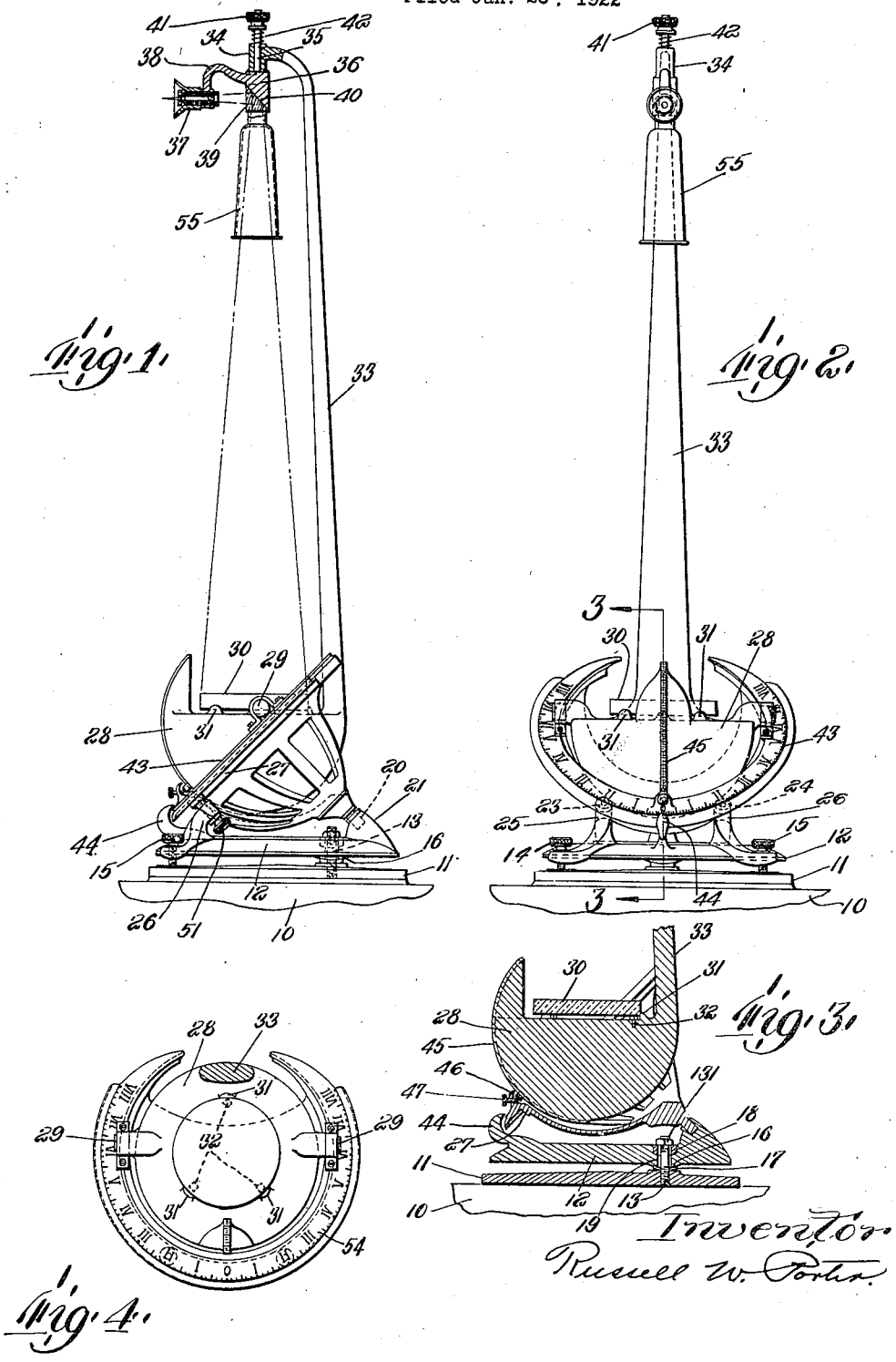

1,468,973

UNITED STATES PATENT OFFICE.

RUSSELL W. PORTER, OF SPRINGFIELD, VERMONT.

REFLECTING TELESCOPE.

Application filed January 25, 1922. Serial No. 531,526.

*To all whom it may concern:*

Be it known that I, RUSSELL W. PORTER, a citizen of the United States, residing at Springfield, in the county of Windsor and State of Vermont, have invented new and useful Improvements in Reflecting Telescopes, of which the following is a specification.

This invention has for its object to provide a telescope for terrestrial and celestial observation of such character that it may be manufactured and sold at a reasonable price, that it may be capable of standing the relatively rough usage of amateurs and non-professionals, that it may be mounted permanently upon a pier or support so as not to require placement before or removal after use, and that it will lend itself to ornamental treatment so that it may form a pleasing feature of a garden.

On the accompanying drawings, I have illustrated an embodiment of the invention which meets these several objects.

Figure 1 represents the telescope in side elevation with the parts adjusted for celestial observation in the zenith.

Figure 2 represents a front elevation of the same.

Figure 3 represents a section on the line 3—3 of Figure 2.

Figure 4 represents a plan view partially in section with the parts adjusted so that the reflecting mirror is in a plane substantially parallel with the plane of the hour circle.

The telescope, which I have illustrated as embodying my invention and which is hereinafter described more in detail, comprises an ocular, a concave paraboloidal mirror, and a prism or silvered diagonal, with the ocular and the prism held at a fixed distance from the mirror and capable of adjustment therewith about the polar axis as well as about the axis of declination. The ocular and the prism are rotatable about the optical axis of the mirror for the convenience of the observer. The mirror and the ocular together with the prism are separable from the other elements of the telescope, so that, after an observation has been completed, they may be removed and placed in a case for safe keeping from the weather.

The optical arrangement is a modification of the Newtonian and Herschellian types, the prism or silvered diagonal and the laterally projecting ocular of Newton's telescope being retained, and the concave reflecting mirror being less displaced than in the Herschellian telescope, so as to bring the ocular and the diagonal closer together. The tubes of both said types of telescope are dispensed with, and the ocular and prism are supported by a standard or blade arising from one side of that element of the mounting on which the reflecting mirror is supported.

On the drawings, I have shown at 10 the upper portion of a pier which may be built in permanent form of masonry, brick or concrete, on which the telescope is mounted and on which is supported and secured by any suitable means a base plate 11. A base 12 is held upon the base plate by a three-point support. To this end the base is secured to the base plate by a bolt 13 at its rear, there being in addition two supporting abutment screws 14, 15 which pass through lugs or brackets on the base and rest upon the base plate as shown in Figures 1 and 2. Preferably the base, surrounding the bolt 13, is provided with a convex boss 16 between which and the base plate there is placed a complemental washer or collar 17. A collar 18, whose lower end is rounded, is arranged between the nut 131 and the bolt and the bottom of the socket 19 in which the collar 18 is placed. It will be readily seen that, by loosening the nut 131 and adjusting either or both of the screws 14 and 15, the base may be adjusted to accurate position.

The base 12 serves to support a hollow member of the mounting which for convenience I term a bell. This bell is substantially semi-spherical in shape, except that its rear wall is cut away or removed. In line with its axis it is provided with a pivot or trunnion 20 which is seated in a thrust socket or bearing 21 formed on the base 12 so that the bell is capable of being moved about its axis. Inasmuch as the mounting is equatorial, the axis of movement of the bell is coincident with the polar axis, being in Figure 3 approximately at an angle of 45° to the horizontal. This bell is likewise supported at three points; that is, it is supported by the trunnion 20 and bearing 21 and by two rolls 23, 24 formed on or secured to spindles or arbors which are journaled in lugs or brackets 25, 26 on the base 12. The rolls and the trunnion are so arranged relatively to each other that they permit the bell to be moved about its axis and support it evenly against downward thrust. The rolls bear against a cylindrical track 27 formed on the bell, as shown in Figures 1 and 3. Supported upon the bell for movement about the declination axis there is a hemispherical member 28 which constitutes the support for the reflecting mirror and with which the ocular and prism or diagonal are connected to move bodily therewith. Preferably this member is solid and is provided with trunnions 29 which are journaled in the hollow hemispherical shell or bell, the axis of these trunnions constituting the axis of declination. The member 28 is provided with a socket to receive the paraboloidal concave mirror 30 which preferably is of glass. The socket may be formed by a continuous or an interrupted flange as may be desired. I have shown an interrupted flange comprising the three upwardly projecting lugs 31 equally spaced from each other and having their inner faces coincident with a circle whose diameter is equal to the outside diameter of the reflecting mirror. The mirror preferably rests upon three equally-spaced adjusting screws 32 so that the optical axis of the mirror may be adjusted. Rising from the rear side of the member 28, or bowl as I may term it, there is a blade or standard 33 which is rigid therewith. The upper end of the standard is turned forwardly and is so formed at its extremity as to provide a bearing 34. In this bearing there is removably journaled a spindle 35 having at its lower end a head 36 which supports both the ocular and the prism or diagonal. The ocular, which is indicated as a whole at 37, is supported by an arm 38 projecting laterally from the head 36. The diagonal, which is indicated conventionally at 39, is supported in a shell 40 formed on or secured to the head 36 and having an opening in its side through which the bundle of light rays may pass to the ocular. Of course the ocular and the diagonal are arranged at the proper focal distance from the concave mirror, the length of the standard or blade being determined by the focal length of the mirror and the distance between the ocular and the prism or diagonal. The upper end of the spindle projects beyond the bearing 34 and is provided with a threaded end on which there is a knurled nut 41. Between this nut and the end of the bearing there is placed preferably a compression spring 42 which holds the head 36 frictionally and tightly against the lower end of the bearing so as to maintain the arm 38 in any position to which it may be adjusted about the axis of the spindle, which of course is coincident with the optical axis of the mirror or reflector.

The mirror is very slightly displaced, so that its optical axis diverges, in the direction of the ocular, from the axis of the bowl on which it is mounted.

From the description thus far given, it is quite apparent to those skilled in the art that the telescope may be trained upon any object or body, either terrestrial or celestial, by swinging the bell about the polar axis, i. e. about the axis of the pivot 20, and by moving the bowl or member 28 about the axis of declination, i. e. about the axis of the trunnions 29.

The bell is provided with a flat rim or flange 43 upon which is marked the hour circle 54 in ten-minutes divisions. An index or pointer 44 formed on or secured to the base is arranged to project in close proximity to the flange 43 so as to cooperate with the hour circle as best indicated in Figures 2 and 3. The bowl or member 28 is provided with a boss 45 having a graduated scale thereon and arranged concentric with the axis of the trunnions 29, and on the bell is secured an index or pointer 46. Provision is thus made whereby the telescope may be set on any celestial object by taking the proper qualities from the ephemeris or nautical almanac. After adjusting the telescope to the proper declination about the declination axis as indicated by the index or pointer 46, it may be clamped in that position. To this end, the bowl is clamped to the bell by the clamping screw 47, thus providing a large leverage for holding the bowl securely to the bell. After the telescope is clamped in declination, the instrument may then be moved in right ascension by rotating either or both of the rolls 23, 24. For this purpose, the spindles on which the rolls are secured are provided with knurled knobs 51 by which they may be rotated. The observer may, by the rotation of one or the other of the rolls, overcome the diurnal motion of the earth and hold any celestial object in the center of the field of view.

One of the advantages of a mounting such as I have described is that the primary mirror 30, which constitutes the principal weight, lies between the bearings or trunnions of the declination axis and midway above the three points of support which are so located that lines drawn from the center of weight of the moving parts thereto form (in the latitude of Springfield, Vermont) an almost perfect tetrahedron, thus providing a compact, solid and rigid construction, suitable not only for small instruments but also for large ones where the weight of the mirror is great. Another advantage of the form of mounting is that it requires no additional weights for counterpoising. The bowl 28 and the standard or blade 33 are in equilibrium about the declination axis; and, by displacing the declination axis slightly to one side of the polar axis as shown in Figure 1, in order to compensate for the weight lost by removing the rear side of the bell, the center of weight of all moving parts is brought into the polar axis and the telescope will remain equipoised. The rear side of the bell must be removed to receive the extension of the standard or blade 33 from the bowl or member 28, and to permit the movement thereof about the declination axis. The bell is preferably more or less in skeleton form so that it will not retain water.

All of the various parts of the telescope, with the exception of the optical train, may be cast in bronze or other durable metal so as to remain permanently mounted upon the pier without injury from the elements. They may be formed to present a highly ornamental or ornate appearance, and, if desired, the rim of the bell and the crown of the base may be inscribed with the names of great astronomers, signs of the zodiac, etc.

The telescope as herein described has all of the means necessary for adjusting the optical train and bringing the polar axis parallel to that of the earth for all positions between the 35th and the 55th parallels of north latitude. This, as has been stated, may be accomplished by releasing the nut of the screw 13 and adjusting the screws 14 and 15. The optical axis of the concave mirror may be adjusted by means of any one of three screws 32. Provision is also made, as has already been described, for turning the eye-piece and the prism about the optical axis of the mirror so that one may observe at any convenient or desired angle. Not only is the telescope adapted for use on celestial objects, but, by reason of its mounting, it may be trained upon terrestrial objects as well. When used in observing celestial objects, it may, with the aid of the hour circle and the declination scale, be trained upon such object and then caused to follow the object by the rotation of one of the supporting rolls for the bell.

In order to prevent scattered light from entering the eye-piece or ocular when the telescope is used for terrestrial observation in daylight, a removable tapering shield 55 is telescoped or otherwise attached to the shell 40, as shown in Figure 1. For night work, this shield may be easily removed.

It is apparent that my invention is capable of many different embodiments, and that many changes may be made in the particular embodiment of the invention herein shown and described without departing from the spirit and scope of the invention as defined in the claims.

Having thus explained the nature of my said invention and described a way of making and using the same, although without attempting to set forth all of the forms in which it may be made or all of the modes of its use, what I claim is:—

1. An astronomical reflecting telescope comprising a reflector, a prism or diagonal and a laterally arranged ocular, in combination with a support for the reflector capable of movement about the polar axis and the declination axis and a standard rigidly connected with and extending upwardly from said support and having the ocular and prism or diagonal mounted at its free end.

2. A reflecting telescope comprising a paraboloidal reflector, a tilting support therefor, a standard or blade extending from one side of said support in a direction longitudinal of the optical axis of said reflector, a prism or diagonal mounted on said standard or blade and intersecting said optical axis, and an ocular mounted on said arm or blade in optical relation to said prism or diagonal.

3. A reflecting telescope comprising a support having pivots or trunnions by which it may be hung, a standard or blade arising from one side thereof and having a bearing at its free end, a paraboloidal reflector on said support, a member journaled in said bearing with its axis coincident with the optical axis of said reflector, an ocular on said member arranged transversely of said axis, and a prism or diagonal supported by said member in optical relation to said reflector and said ocular.

4. A reflecting telescope comprising a hemispherical bowl or member having pivots or trunnions by which it may be hung, a paraboloidal reflector supported on said bowl, a standard or blade rising from one side of said bowl, and an ocular mounted on the free end of said standard.

5. A reflecting telescope comprising a paraboloidal reflector, a support therefor having a standard rising from one side thereof, an ocular and a prism or diagonal mounted in the free end of said standard in optical relation to said reflector, trunnions for said support, and a member in which said trunnions are journaled.

6. A reflecting telescope comprising a paraboloidal reflector, a solid hemispherical support having a socket on its flat face to receive said reflector, a standard rising from one side of said support and supporting parts of the optical train at its free end, and trunnions projecting laterally from said support, with their axis displaced laterally from the optical axis of said reflector, and above the face of said support, whereby said support and the parts thereon are equipoised.

7. A reflecting telescope comprising a support movable about the declination axis, a paraboloidal reflector removably mounted thereon, a standard rising from one side of the support, a member removably journaled in the free end of said standard with its axis coincident with the optical axis of said reflector and having a laterally projecting arm, an ocular in the said arm, and a prism or diagonal on said member, whereby said prism or diagonal and said ocular are bodily removable with said member from said standard.

8. A reflecting telescope comprising a solid hemispherical bowl or support, a blade or standard rising from one side thereof and provided at its free end with a bearing, a paraboloidal reflector seated on the flat face of the bowl with its optical axis substantially coincident with the axis of said bearing, a spindle journaled in said bearing and having a laterally projecting arm, a prism or diagonal supported by said spindle, an ocular supported by said arm, and means for mounting said bowl by which it is movable about the polar axis and the declination axis.

9. A telescope comprising a solid hemispherical bowl having a standard rising from one side thereof and an optical train supported on said bowl and standard, and comprising a laterally arranged ocular supported by said standard to move about the optical axis of another member of the train.

10. A telescope comprising a base, a bell having an axial end thrust trunnion socketed in said base, and spaced rolls engaging the large end of said bell, whereby said bell is supported on said base by a three-point bearing, said bell having an hour circle at its rim, a hemispherical support trunnioned on said bell to move about an axis transverse to the axis of said bell, and an optical train supported by said hemispherical support.

11. An equatorial telescope comprising a base, an adjustable three-point support for said base, a hemispherical bell having an axial end thrust trunnion socketed in said base, spaced rolls engaging the larger end of the bell, said parts being arranged with the axis of said bell coincident with the polar axis, an hour circle on said bell, an index or pointer on said base associated with the hour circle, a reflector, a support therefor trunnioned on said bell to move about a declination axis, and a graduated segmental scale and an index on said support and bell to indicate the angle of declination.

12. An equatorial telescope comprising a bowl having a standard rising from one side thereof, an optical train supported by said bowl and standard, a bell in which said bowl is mounted to move about an axis of declination and having an hour circle extending about the rim thereof, and a base on which said bell is mounted to move about the polar axis and having an index associated with the hour circle.

13. An equatorial telescope comprising a bowl having a standard rising from one side thereof, a bell in which said bowl is mounted to move about an axis of declination and having an hour circle extending about the rim thereof, a base on which said bell is mounted to move about the polar axis and having an index associated with the hour circle, an ocular and a prism mounted on the free end of said standard, and a paraboloidal reflector placed on said bowl in optical relation to said ocular and prism or diagonal.

In testimony whereof I have affixed my signature.

RUSSELL W. PORTER.